United States Patent

Giraudi

[15] 3,699,742

[45] Oct. 24, 1972

[54] APPARATUS FOR VACUUM WELDING OF PLASTICS ENVELOPES

[72] Inventor: Giorgio Giraudi, Rho, Milan, Italy

[73] Assignee: W. R. Grace & Co., New York, N.Y.

[22] Filed: Feb. 18, 1971

[21] Appl. No.: 116,332

[52] U.S. Cl. .................................. 53/86, 53/112 B
[51] Int. Cl. ............................................ B65b 31/02
[58] Field of Search ..53/22 B, 79, 84, 85, 86, 89–93, 53/95, 96, 112 B, 388; 156/498

[56] References Cited

UNITED STATES PATENTS

| | | |
|---|---|---|
| 2,778,177 | 1/1957 | Mahaffy et al...................53/86 |
| 3,471,990 | 10/1969 | Bonuchi et al. ......53/112 B X |
| 2,991,609 | 7/1961 | Randall......................53/86 X |
| 3,162,564 | 12/1964 | Buchner....................156/498 |
| 3,496,049 | 2/1970 | Anderson ..............156/498 X |

*Primary Examiner*—Travis S. McGehee
*Attorney*—J. J. Toney

[57] ABSTRACT

The specification discloses vacuum packaging apparatus including welding bars, and clamping bars for holding the edges of the packaging envelope before, during, and after the welding operation. Preferably the clamping bars may have grooves therein to facilitate escape of air from within the envelope during the evacuation phase. A jet of air is blown across the welded edge to cool the weld and facilitate separation of the welded edges from the welding bars.

6 Claims, 8 Drawing Figures

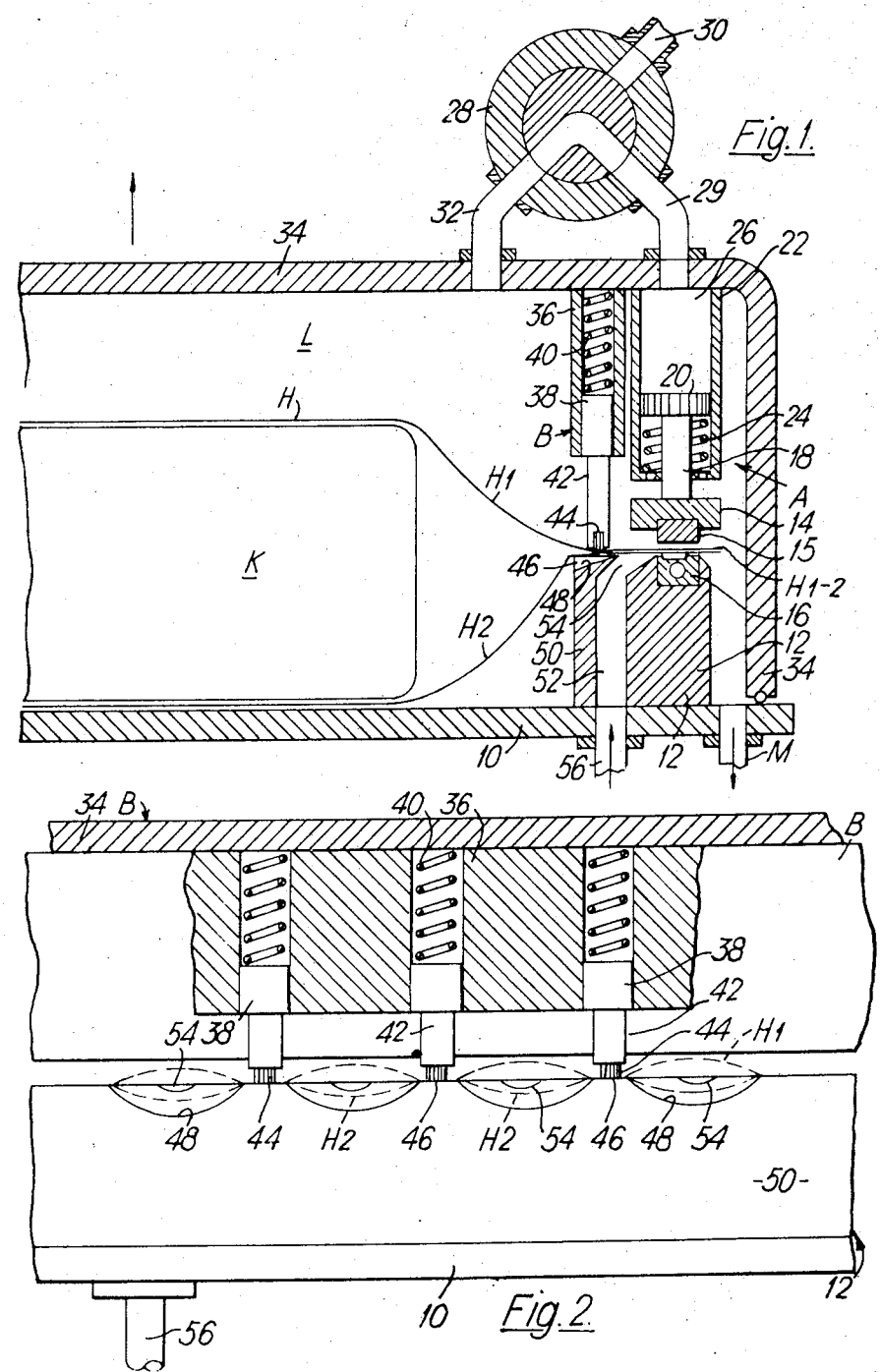

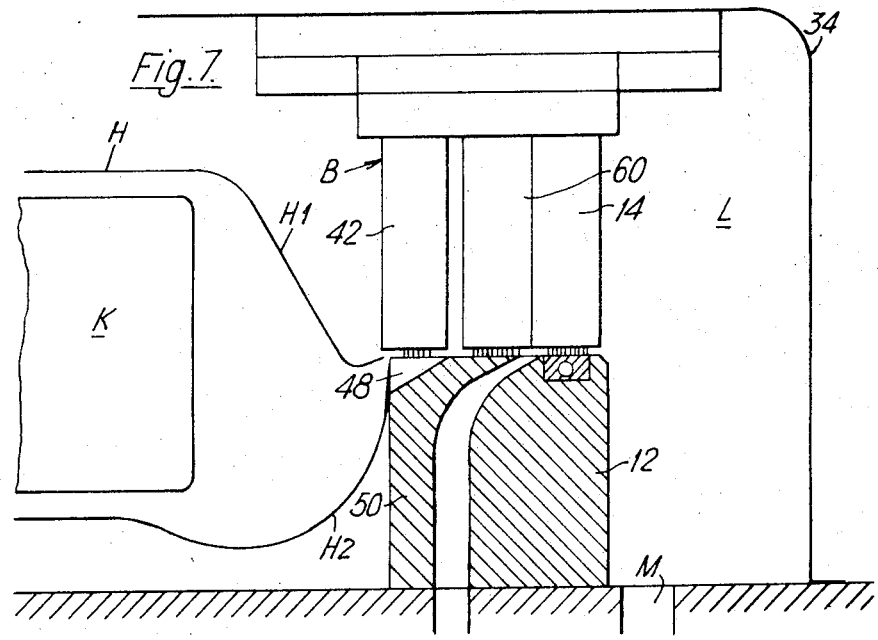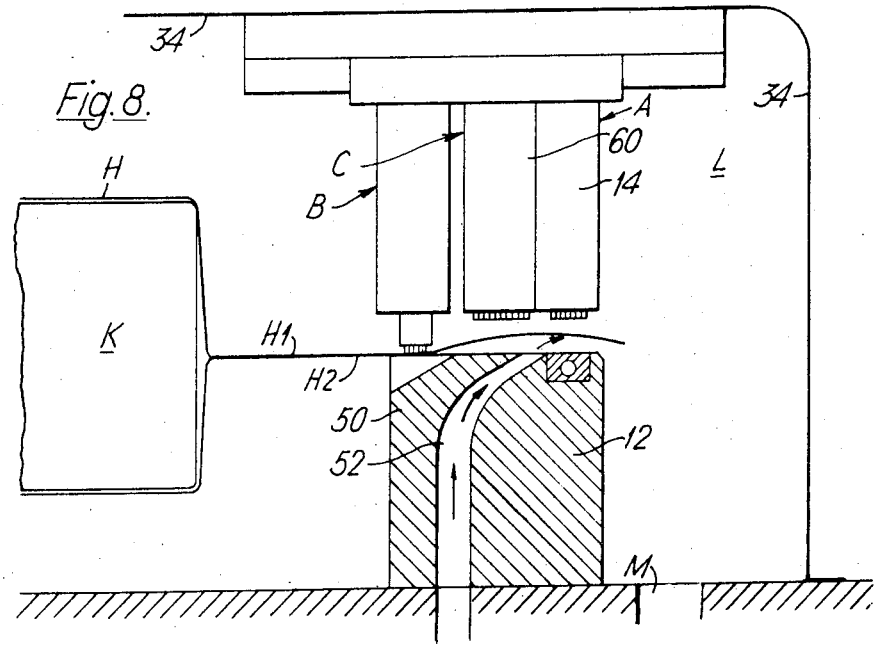

APPARATUS FOR VACUUM WELDING OF PLASTICS ENVELOPES

This invention relates to a method and apparatus for producing a sealed closure by welding of coverings or packagings comprising a film of plastics material. The invention enables the openings of coverings or packagings such as bags or envelopes made of thermoplastic films or connected thermowelding films to be closed by thermowelding once the goods to be packaged have been placed inside them and after the coverings have been put in an enclosure from which the air is evacuated to give a vacuum seal after closure.

Existing machines for vacuum closure of bags or envelopes made of plastics material incorporate a bell which can be hermetically sealed and which houses means for closing the bag or envelope by thermowelding.

These means generally comprise two parallel bars, at least one of which is fitted with heating means for fusing the material or thermoplastic layers. At least one of these bars is moveable, so that it can be pressed against or moved away from the other, leaving a free space or gap between the bars. When the envelope to be welded is of thermoplastic material, the said heating means are mostly of the type where a surface resistor is heated rapidly to the required temperature by an electric current pulse which can be regulated as regards intensity and/or duration, this surface then being cooled as quickly as possible to its original temperature.

One or more packages, previously filled with goods, are placed inside the bell so that the edges of the package openings are located between the welding bars while the latter are in the open or parted position. The air is then evacuated from inside the bell and hence also from inside the package through the opening in it. Next, after reaching the required degree of rarefaction, automatic controllers activate the welding bars, which seal the opening in the bag or envelope. Once the welding has been carried out, a suitable period elapses for cooling the thermoplastic material which is now in the fused state, after which the atmospheric pressure can be restored inside the bell, and the welding bars and the bell reopened to permit removal of the finished packages.

Although closure systems incorporating the machines described give good results with bags or envelopes made of particular plastics materials, these same machines are very difficult to use on packagings of other plastics materials since they result in a high percentage of rejects while in certain cases they are quite impracticable.

For reasons which will be given below, these limitations relate mainly to the use of highly flexible films either because they are very thin or because of the non-rigid nature of the material itself. The limitations are very important in the case of thermoplastic films which have low viscosities at the welding temperature.

Other properties of the films employed, such as stickiness and adhesion and capacity for contraction or shrinkage at temperatures below the welding temperature, can combine to limit the application and use of such films. The low rigidity of the materials employed for packaging may be a drawback, since it permits or facilitates the formation of folds or wrinkles in the weld zone which then becomes irregular and does not ensure a sealed closure. Depending on the type of material used, the folds can form passages or cracks running across the weld, or perforations of the film in the weld zone adjacent to the fold. In either case, welding fails to give a hermetic seal and the package will leak after a certain time. The folds and consequent perforations in the weld zone can be caused by negligence in locating the bag or envelope in the evacuation bell, but in general almost all the folds are due to stresses set up on the bag or envelope during the air extraction phase.

To eliminate this drawback, solutions have been studied for keeping still the zone of the package corresponding to the opening in it. The equipment employed for such purposes employs mechanical spring-mounted pins which, acting inside the package and at the extremities of the opening, tension the walls in the welding zone. Such equipment therefor has the drawback of being rather complicated and delicate, slowing down the operations of moving the package or packages into and out of the bell, and requiring adjustment or regulation each time the shape of the package changes. Moreover, whereas the main causes of folding are compensated and eliminated, they can in turn cause other drawbacks resulting in the formation of other characteristic folds in the area of the package where the spring-mounted pins act.

The low viscosity and mechanical strength of the thermoplastic film at the welding temperature, increase the risk of damage to the welded zone when this undergoes tensioning or any other stressing from outside. So far, however, the stresses on the welding zone set up on the package inside the container as a result of thermowelding under vacuum have not been found harmful. These stresses originate on the package inside a chemaber under vacuum during various phases of the cycle.

It has been shown that during the phase of evacuation of the air from inside the container an overpressure is set up inside the package with consequent swelling of the container and settling of the material therewithin. This swelling leads to stresses in the walls of the package, which remain even after the welding bars have closed to carry out thermowelding and thus the stresses affect the heated zone of the film.

When atmospheric pressure is restored inside the bell, the walls of the bag or envelope are pressed down and made to adhere firmly against the goods therewithin. These movements force the plastics material against the product and tend to detach the film from the welding bar while the plastics material is still hot and thus sensitive to mechanical deformations. This action extends in a direction tangential to the surface of contact between the welding bar and the film, an unfavorable direction for overcoming the adhesive forces arising between the welding bar and the film after welding in view of the residual stickiness of the film. In most cases these forces do not in fact succeed in detaching the film from the welding bar, but they do damage both the welded zone of the film and also the heated zone immediately adjacent to the welding element.

When the air chamber is raised another machanical action is exerted on the weld zone by the operator who removes the package now completed. Removal is generally done in fairly rapid movements, and since the adhesive forces between the film and the welding bars have to be overcome this causes stresses and deformations in the film which vary with the skill of the operator.

One attempt to obviate the drawbacks caused by the above mentioned stresses involved limiting the damage which can occur during removal of the film from the welding bar. In particular, the tendency of the film to remain stuck to the welding bar has been reduced by both interposing a strip of non-sticking material (PTFE in thin films or impregnated on glass fiber-fabric is well known in this connection) and cooling the thermoplastic material prior to restoration of atmospheric pressure in the air bell and removal of the bag from the welding bar.

Both these measures are used in practice, but they cannot directly resolve the problem in more serious cases. Certain materials lose their crystalline structure during heating and only regain it slowly after cooling. In the amorphous state these materials are of low strength and thus the weld zone remains particularly vulnerable even after cooling. It is obviously impossible and uneconomic to halt the production cycle until crystallization occurs.

Another difficulty encountered on welding certain thermoplastics is that, in order to ensure a good transmission of heat and bonding between the layers to be welded, the layers must be submitted to a certain pressure between the welding bars. This pressure is generally also exerted during the phase of cooling of the material; in the case of materials which have a low viscosity at the welding temperature this can result in decrease in the thickness of the film, which therefore has a low strength at the welding point. With certain thermoretracting materials it is possible to improve the strength at the weld by promoting uniaxial or biaxial shrinkage of the film, in order thus to increase the thickness of the film in and alongside the welding zone. Previous attempts to achieve this have all been based on the shape of the heater and its mode of operation, and all involve the risk of producing overheating and undesirable shrinkage stresses, with consequent unacceptable perforation of the film.

The present invention obviates these drawbacks and in particular eliminates the formation of folds in the zone of opening of the bag or envelope to be welded during the phase of evacuation of air from inside the bag thus avoiding undesirable stresses in the weld zone both during evacuation of the air from inside the bag to be welded and during restoration of atmospheric pressure inside the bell. Another object of the invention is to minimize the stresses exerted in the weld zone during removal of the package from the welding bar, and to accelerate the cooling of the film during this operation. A further object of the invention is to increase the thickness of the film in the weld zone by utilizing the surface tension forces and shrinkage forces which arise in thermo-shrinking materials when they are heated.

According to one aspect of the present invention there is provided apparatus for sealing plastics envelopes by vacuum welding, and comprising a vacuum chamber, welding bars mounted in the chamber for closing and welding the edges of the mouth of a packaging envelope of plastics material, at least one pair of clamping bars parallel with said welding bars for clamping the envelope mouth before, during and after welding, one or more of the clamping bars being formed with grooves to allow partial separation of the edges of the mouth of an envelope clamped between the clamping bars to ensure evacuation of the air from within the envelope while permitting the clamping bars to hold the said edges firmly in position before and after evacuation of the envelope.

According to a second aspect of the present invention there is provided apparatus for sealing plastics envelopes by vacuum welding, and comprising a vacuum chamber, welding bars mounted in the chamber for closing and welding the edges of the mouth of a packaging envelope of plastics material, and at least one nozzle constructed and arranged to pass a jet of air across the surface of one of the welding bars between the welding bar and the welded package mouth for cooling the weld and facilitating detachment of the welded zone from the welding bar.

According to a further aspect of the invention there is provided a process for vacuum packaging of material in plastics envelopes, and comprising clamping the mouth of a filled plastics envelope at locations spaced along the edges of the mouth, subjecting the exterior of the envelope to a vacuum allowing air within the envelope to be discharged for thereby evacuating the interior of the envelope, sealing the mouth by employing a pair of relatively movable welding bars, separating the welding bars, restoring pressure to the exterior of said welded envelope and finally removing clamping restraint from the mouth of the envelope.

According to a further aspect of the invention there is provided a process for vacuum packaging of materials in plastics envelopes, and comprising holding the mouth of a filled plastics envelope between two welding bars in an evacuating chamber, applying heat through at least one of the welding bars, moving the welding bars apart, and blowing air across the welded zone from nozzles directed across at least one of the welding bars to expedite cooling of the welded zone and detachment of the welded zone from the welding bar.

Finally the invention relates to a package formed using any of the above apparatuses and methods.

Of the pair of welding bars 12 and 14 it is preferable for the unheated bar 12 to be withdrawn or opened since this bar attains the lower temperature during the welding cycle and thus the film can be detached more easily without damage. The film can only be detached from the heated welding bar once the film has had time to cool down. This procedure enables speeding up of machine operation by using means for raising one of the welding bars a certain time before atmospheric pressure is restored in the bell.

In order that the present invention may more readily be understood the following description is given; merely by way of example, reference being made to the accompanying drawings, in which:

FIG. 1 shows diagrammatically the transverse cross-section of a vacuum packaging machine fitted with the equipment according to the present invention, the section being taken on line I—I of FIG. 2;

FIG. 2 gives a partial sectional view taken along line II—II of FIG. 1;

FIGS. 4 to 8 illustrate diagrammatically the various phases of operation of the equipment for sealing a cover of thermo-retracting material.

Figure 3:
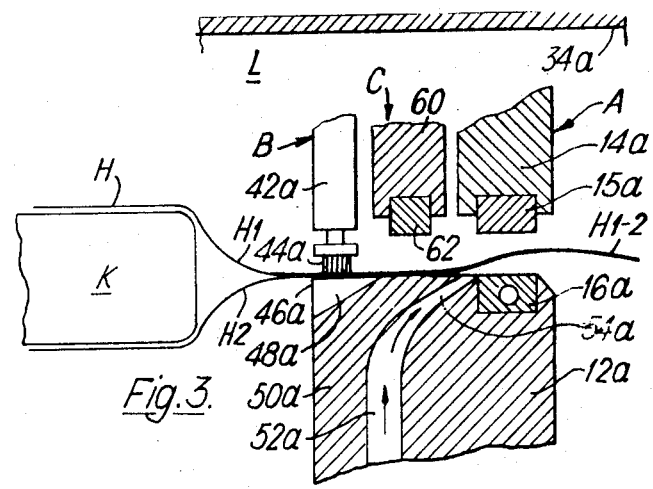
FIG. 3 is a view corresponding to FIG. 1, but showing a further embodiment of machine.
Figure 4:
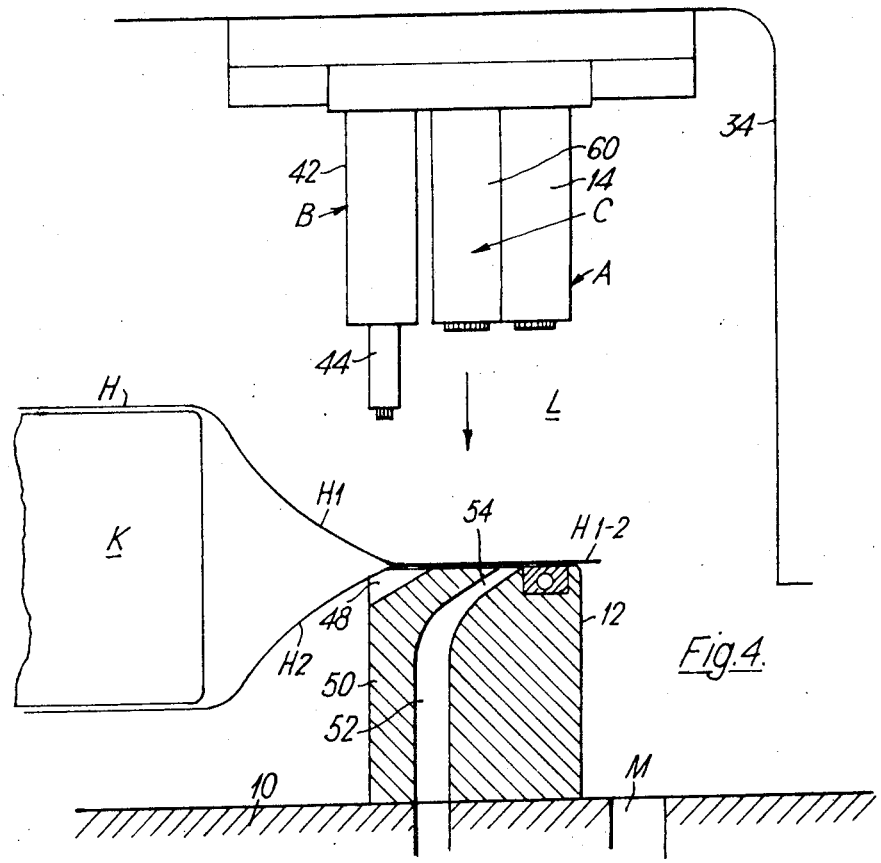
Figure 5:
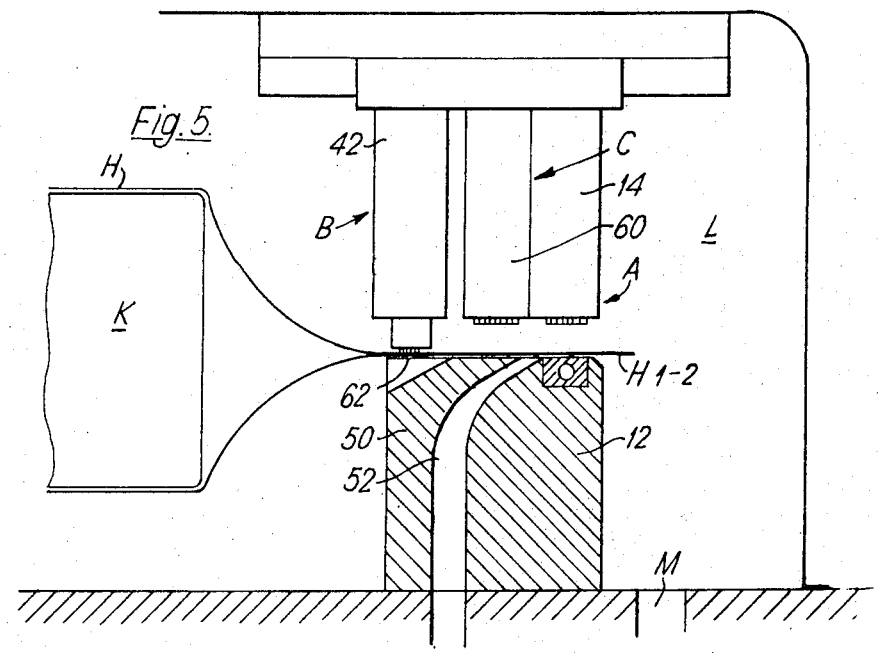
Figure 6:
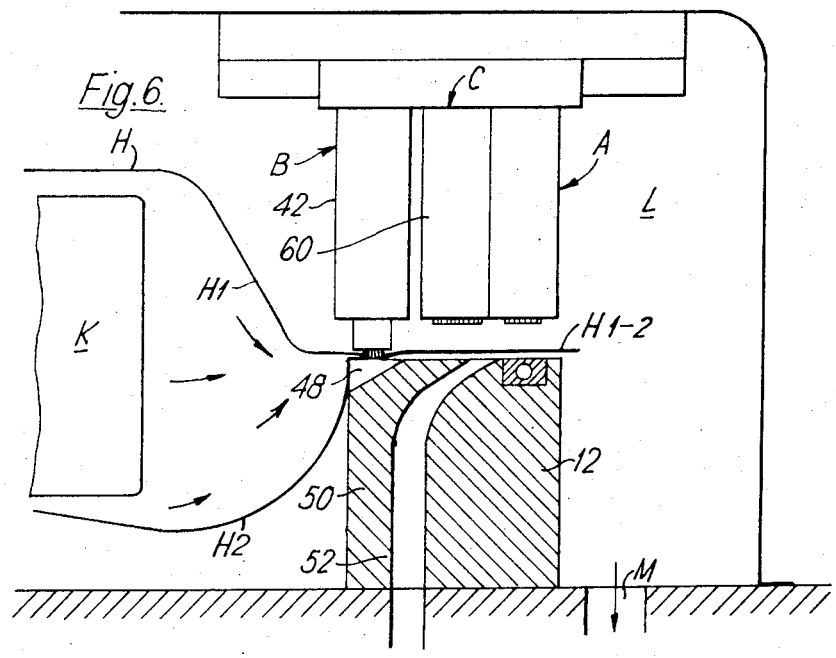

With reference to FIGS. 1 and 2, the machine illustrated diagrammatically comprises a table 10 on which the object to be packaged is placed after being put in an envelope H of suitable shape made of thermoweldable plastics material.

The filled envelope H is arranged on the table 10 with the edges $H_1$ and $H_2$ of the mouth of envelope H positioned between the welding bars A comprising a fixed bar 12 and a relatively moveable bar 14 carrying an elastic pad 15 provided with an electrode 16, which bars 12 and 14 suitably press together the edges $H_1$, $H_2$; this electrode 16 is connected to a suitable source of electric power. Electrode 16 should be coated with a film of polytetrafluoroethylene to reduce stickiness between the bar and the plastics material.

The moveable welding bar 14 is held by the piston rod 18 of a piston 20 moving in a cylinder 22, one of the surfaces of the piston being acted on by a compression spring 24 to urge the bar 14 away from the fixed bar 12. The upper chamber 26 of the cylinder 22 is connected to one of the connections 29 of a 3-way valve device 28, the other connections 30, 32 of which are connected to the surroundings and to an air chamber L, which encloses the package H,K. This chamber is defined by a bell 34, which is free to move in the vertical direction and to which are fixed the piston and cylinder device 20,22 with the moveable bar 14 and other parts to be detailed below.

The welding bars 14 and 16 are combined with at least one pair of clamping bars B for the edges $H_1$, $H_2$ of the mouth of envelope H, and it is preferred that at least one of the bars should be rubberized to increase friction between the bars and the plastics film material. In the embodiment illustrated in FIGS. 1 and 2, a cross-member 36 integral with the cylinder 22 runs parallel to the welding bars 12 and 14 and contains a series of holes, each housing a plunger 38 which is acted on by a spring 40 and incorporates at its free end a stem 42 terminating in a plastic or a rubberized pad 44.

The pads 44 of the plunger 38 of the cross-member 36 bear on the upper surface 46 of the fixed bar of the pair of clamping bars B under consideration. In the apparatus illustrated in FIGS. 1 and 2 the fixed clamping bar is formed by an upstanding wall 50 located alongside the fixed welding bar 12 and incorporating a set of profiled grooves 48 running transversely thereon. The grooves 48 are suitably profiled and dimensioned to fulfil their function which will be discussed later. In particular, the transverse cross-section of each groove 48 diminishes in the direction from the wall 50 to the welding bar 16.

With the arrangement already considered and clearly illustrated in FIG. 2, the edges $H_1$,$H_2$ are clamped and held at locations spaced apart at set distances based on the pads 44. The spacing of the pads 44 is governed by the spacing of the grooves 48, while the maximum width of these latter is determined as a function of the properties of the plastics material making up the covering H.

The block formed by the wall 50 which in the case illustrated is integral with the welding bar 12, incorporates channels 52 which communicate nozzles 54 with a source of air under pressure, the nozzles being suitably arranged so that their mouths are in line with the rear edge of the electrode 16 and the tapered ends of the grooves 48, so as to direct one or more jets of air on to the faces of the edge H and of the electrode.

The moving parts of the welding and clamping bars A, B, are carried by the bell 34, and thus move therewith during the operating cycle, which will be detailed below and during which welding of the edges $H_1$ and $H_2$ occurs.

FIG. 3 illustrates an alternative design of the equipment comprising a pair of auxiliary clamping bars C, parallel with and beyond the bars A. In this Figure, the parts identical with those in FIGS. 1 and 2 are denoted by the same symbols. The fixed bar of the pair of bars C is an integral part of the fixed welding bar 12a and the fixed clamping bar 50a. On the other hand the moveable bar 60 of the pair of auxiliary clamping bars C is also connected to the bell 34a through one or more cylinder-piston groups, e.g. pneumatic motors, actuated independently of the motor (not illustrated) corresponding to motor 20,22 of FIGS. 1 and 2, and which operates the group of moving bars 14a and 42a. The moving parts of these cylinder-piston groups are connected to the bar 60 which ends in an elastic pad 62 bearing on and continuously clamping the edges $H_1$, $H_2$ of the covering H against the fixed clamping bar 50a. In this case, bar 60 is actuated during or immediately before welding of the edges $H_1$, $H_2$ while bar 42a is operated during the vacuumizing operation.

The characteristic phases of the procedure for closing and sealing of the package H,K, will now be described with reference to FIGS. 4 to 8, firstly with reference to the device of FIGS. 1 and 2 and secondly relative to that of FIG. 3.

The package H,K with the goods K located in the covering H in the manner described, is placed on the table 10 with the edges $H_1$, $H_2$ of the envelope mouth resting on the upper surface of the bar 12,50. Then the bell 34 is lowered so that its edge is sealed against the surface of the table 10, thus closing the evacuation chamber. During lowering of the bell 34, the moveable bars 14 and 36 are brought close to the corresponding fixed bars 12,50 so that the elastic pads 44 (FIG. 1) are pressed elastically against the fixed clamping bar 50 to hold the edges $H_1$, $H_2$ of the envelope H. Meanwhile the moveable welding bar 16 is held away from the corresponding fixed bar 12 through the action of the compression spring 24. Thus through the presence of the grooves 48, the edges $H_1$ and $H_2$ are free to move apart from each other to form openings in register with these grooves 48, through which the air from the envelope H can escape when the chamber L is evacuated.

After the partial clamping of the edges $H_1$ and $H_2$, the chamber L is connected to the vacuum source by operating a shut-off valve (not shown) in the piping M (see FIG. 6), and the air is evacuated from the chamber L and envelope H and hence also in the chamber 26 above piston 20 since the threeway valve 28 connects the chambers 26 and L. Thus the required degree of vacuum is created in the envelope. During this operation the air is easily removed from the envelope H since a pressure difference is set up between the chamber L and the inside of the envelope, drawing apart the zones of the edges $H_1$ and $H_2$ located in register with the grooves 48 and the pads 44, hence facilitating evacuation of the envelope.

Once the required degree of vacuum is attained in the envelope H, the shut-off device 28 is operated to cut off communication between the chambers L and 26 and to vent chamber 26 to atmosphere through the connection 30. The resulting pressure differential across piston 20 causes the moveable welding bar 14 to be lowered and pressed against the fixed bar 12. The electrode 16 is then connected to the electric power source for welding. After welding, the shut off valve 28 is operated once more to the FIG. 1 position to connect the chambers L and 26 allowing spring 24 to withdraw the welding bar 14. Finally, communication is restored between the interior of the chamber L and atmosphere, prior to opening the bell 34.

This communication is attained by operating a shut off valve (not shown) provided at the channel 52 feeding the nozzle(s) 54. The air passes over the welded edges $H_1,H_2$ before entering the chamber via the nozzles 54, so that it cools the said edges and detaches them from the fixed welding bar 12. During cooling, the welded edges $H_1,H_2$ are free to undergo the contractions and deformations set up by welding, so that the edges can increase in thickness and swell freely without any stresses being transmitted to the envelope H, since the edges $H_1,H_2$ of the opening are still held between the clamping bars B. By the time atmospheric pressure is restored in the air chamber L, the welded edges $H_1,H_2$ will have cooled and consolidated sufficiently.

Finally the bell 34 is raised, thus lifting the clamping bars B and enabling the package H,K to be removed from the table 10. The machine is then ready to resume the cycle already described, with another envelope.

The operating cycle of the equipment in FIG. 3 is identical with that described above except that the movement of the welding bar 14a is transmitted simultaneously to the clamping bar 60. Securing of the welded edges $H_1,H_2$ in this case is effected by the auxiliary bar 60 pressed against the entire surface 46a of the part 50a of the cross-member 12a,50a. Once atmospheric pressure has been restored in the chamber L, the auxiliary bar is raised and the package is removed from the table 10a.

As a variant to the procedure for welding the edges $H_1,H_2$, it is also considered possible to control the pressure exerted by the moveable welding bar 14 against the corresponding fixed bar. The two welding bars 12,14 are first brought close together so that the edges $H_1,H_2$ are gripped between them, after which welding is carried out. Immediately after welding, the pressure applied to the moveable welding bar 14 is reduced and, if applicable, this bar is then drawn back a short distance from the weld. This arrangement makes it possible to counteract and eliminate the pressure exerted by the welding bars A on the welded plasticsmaterial; the welded edges $H_1$, $H_2$, which are still hot, are thus free to shrink and increase in thickness. Then the nozzles 54a are operated to cool the weld,the cycle continues as described above, the welded edges being still gripped thickness. Then the nozzles 54a are operated to cool the edges being still gripped by the clamping bars B.

It will be understood that the nozzles 54 are directed so that the issuing air jet covers the package over its entire width along the welding line, thus producing controlled and progessive stressing tending to overcome the adhesive forces between the welded material and the welding bar. This avoids concentrations and localizations of stresses at any point of the weld, and the package may thus be removed from the welding bar easily and without tearing, without being subject to operator error. A further advantage of the air jet is that it speeds up cooling of the weld zone. The air jet has to operate at the end of the cooling operation following welding, and after the two welding bars 12 and 14 have opened. This air jet is preferably produced by passing through the nozzle the outside air which is introduced into the bell to restore atmospheric pressure at the end of welding.

The equipment described and illustrated can be incorporated in any machine or installation for vacuum packaging.

The individual design of the equipment described can vary as a function of the individual requirements, in particular relative to the material packaged and the type of film used. The equipment can also comprise means or devices for automatic execution of the welding cycle concerned.

I claim:

1. Apparatus for sealing plastic envelopes by vacuum welding comprising:
   a. a vacuum chamber;
   b. relatively movable welding bars mounted in the chamber for closing and welding the edges of the mouth of a packaging envelope of plastic material;
   c. at least a first pair of relatively movable, cooperating clamping bars parallel with said welding bars for clamping the envelope mouth before, during, and after welding;
   d. grooves formed on at least one of said clamping bars to allow partial separation of the edges of the mouth of an envelope clamped between said clamping bars to ensure evacuation of the air from within the envelope while permitting said clamping bars to hold the said edges firmly in position before and after evacuation of the envelope; and,
   e. a pair of auxiliary clamping bars mounted between the welding bars and the first clamping bars, one of said auxiliary bars being driven and operable in conjunction with said first clamping bars and said welding bars.

2. Apparatus as set forth in claim 1, wherein said grooves extend transversely across the first clamping bars and have a transverse cross section which diminishes in a direction approaching said welding bars.

3. Apparatus as set forth in claim 1, wherein one of the clamping bars of said first pair is movable and the other is fixed, and wherein, the movable bar includes resilient means for exerting a controllable clamping pressure on the mouth edges of an envelope disposed between said fixed and movable clamping bars.

4. Apparatus as set forth in claim 3, wherein said movable clamping bar carries a plurality of plungers each resiliently mounted with respect to the movable bar, and wherein said resilient means comprise a resilient pad on each plunger for clampingly engaging the mouth of an envelope to be sealed.

5. Apparatus as set forth in claim 1 and further including nozzle means optionally connectable to a source of air under pressure and having an outlet located at or near one or both of said welding bars to direct a jet of air over the edges of the welded envelope mouth for expediting cooling thereof and facilitating removal of the welded edges from said welding bars.

6. Apparatus as set forth in claim 1, wherein in said pair of welding bars one bar is movable and the other is fixed, and including nozzle means comprising an array of nozzles extending along the fixed bar.

* * * * *